United States Patent Office 3,629,264
Patented Dec. 21, 1971

3,629,264
TRICYCLOHEXYLTIN 8-QUINOLINOLATES
Kailash C. Pande, Parkersburg, W. Va., assignor to The Dow Chemical Company, Midland, Mich.
No Drawing. Filed Mar. 5, 1969, Ser. No. 804,690
Int. Cl. C07d 33/44
U.S. Cl. 260—270                                    3 Claims

ABSTRACT OF THE DISCLOSURE

Tricyclohexyltin 8-quinolinolates corresponding to the formula:

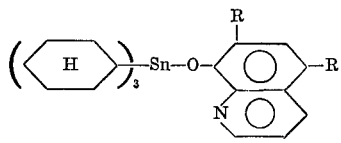

wherein each R independently represents hydrogen, a lower alkyl, a lower alkoxy, a chloro or a bromo group. The compounds are useful as insecticides and microbicides.

SUMMARY OF THE INVENTION

The present invention concerns novel tricyclohexyltin 8-quinolinolates corresponding to the formula:

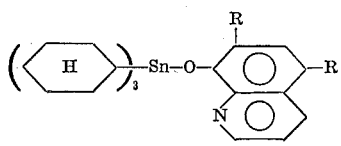

wherein each R independently represents hydrogen, a lower alkyl, a lower alkoxy, a chloro or a bromo group. In the specification and claims, the terms "lower alkyl" and "lower alkoxy" refer to straight and branched chain alkyl and alkoxy groups containing from 1 to 4 carbon atoms, for example, methyl, ethyl, propyl, isopropyl, n-butyl, isobutyl, t-butyl, methoxy, ethoxy, propoxy, isopropoxy, n-butoxy, isobutoxy and t-butoxy. The new compounds are crystalline solids which have a low solubility in water and in ethanol and a higher solubility in common organic solvents such as acetone, benzene, toluene and xylene. The compounds are suitable for use as insecticides and microbicides and are particularly adapted to be used for the control of various insect, fungal and bacterial organisms.

The compounds are prepared by reacting tricyclohexyltin hydroxide with 8-hydroxyquinoline or a substituted 8-hydroxyquinoline, as indicated above, according to the following equation:

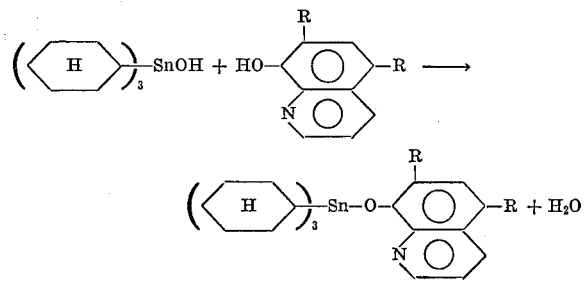

The reaction is conveniently carried out in the presence of cyclohexane or methylcyclohexane or mixtures thereof or in benzene, toluene, xylene, carbon tetrachloride or tetrachloroethylene as reaction medium. The amounts of the reactants to be employed are not critical, some of the product being formed when employing any proportions. The reaction consumes the reactants in the ratio of 1 mole of tricyclohexyltin hydroxide to 1 mole of the 8-hydroxyquinoline reactant, and the use of such proportions is advantageous. A small excess of the 8-hydroxyquinoline reactant is ordinarily used. The reaction proceeds at a temperature at which water of reaction is liberated, conveniently at temperatures between 20° C. and reflux temperature.

In carrying out the reaction, the tricyclohexyltin hydroxide and the 8-hydroxyquinoline reactants are contacted in any convenient fashion and maintained for a predetermined period of time in the reaction temperature range to complete the reaction. The reaction is completed when water of reaction is no longer evolved. In a convenient procedure, the reactants are dispersed in the reaction medium and the temperature of the reaction mixture is maintained within the indicated reaction temperature range.

Upon completion of the reaction, the desired product is separated by conventional procedures. In a convenient operation, the reaction medium is evaporated and the crude product is crystallized from a 1 to 1 mixture of ethanol and methylene chloride or other convenient solvent to give purified product.

DESCRIPTION OF THE PREFERRED EMBODIMENTS

The following examples describe completely representative specific embodiments and the best modes contemplated by the inventor for carrying out the invention.

EXAMPLE 1.—Tricyclohexyltin 8-quinolinolate

Tricyclohexyltin hydroxide, 24 grams, 0.062 mole, 8-hydroxyquinoline, 9 grams, 0.062 mole and methylcyclohexane, 150 milliliters are heated to reflux. Water of reaction is removed azeotropically. When no more water is evolved, the remainder of the solvent is evaporated to give a yellow solid product. One crystallization from a 1 to 1 mixture of ethanol and methylene chloride gives crystals which melt at 101°–102° C. Elemental analysis of these crystals gave: C, 63.2; H, 7.71; N, 2.7; Sn, 23.1 percent. Calculated for tricyclohexyltin 8-quinolinolate are C, 63.3; H, 7.67; N, 2.7; Sn, 23.17 percent. Infrared and nuclear magnetic resonance spectra are consistent with the named structure.

Example 2.—Tricyclohexyltin 5,7-dibromo-8-quinolinolate

The procedure of Example 1 is repeated, substituting an equimolar proportion of 5,7-dibromo-8-hydroxyquinoline in place of the 8-hydroxyquinoline. Upon evaporation of the solvent, a syrupy clear liquid is obtained which is crystallized from a 1 to 1 mixture of ethanol and methylene chloride to give the named product.

In similar procedures, the following compounds of the present invention are prepared.

Tricyclohexyltin 5,7-dichloro-8-quinolinolate, molecular weight 581, by reacting tricyclohexyltin hydroxide with 5,7-dichloro-8-hydroxyquinoline.

Tricyclohexyltin 5,7-dimethyl-8-quinolinolate, molecular weight 540, by reacting tricyclohexyltin hydroxide with 5,7-dimethyl-8-hydroxyquinoline.

Tricyclohexyltin 5,7-dimethoxy-8-quinolinolate, molecular weight 572, by reacting tricyclohexyltin hydroxide with 5,7-dimethoxy-8-hydroxyquinoline.

Tricyclohexyltin 5 - bromo - 7 - methyl-8-quinolinolate, molecular weight 605, by reacting tricyclohexyltin hydroxide with 5-bromo-7-methyl-8-hydroxyquinoline.

Tricyclohexyltin 5 - chloro - 7-methoxy-8-quinolinolate, molecular weight 578, by reacting tricyclohexyltin hydroxide with 5-chloro-7-methoxy-8-hydroxyquinoline.

Tricyclohexyltin 5-methyl - 7-methoxy-8-quinolinolate, molecular weight 556, by reacting tricyclohexyltin hydroxide with 5-methyl-7-methoxy-8-hydroxyquinoline.

Tricyclohexyltin 5-methyl-8-quinolinolate, molecular weight 526, by reacting tricyclohexyltin hydroxide with 5-methyl-8-hydroxyquinoline.

Tricyclohexyltin 5-bromo-8-quinolinolate, molecular weight 591, by reacting tricyclohexyltin hydroxide with 5-bromo-8-hydroxyquinoline.

The new compounds are useful as insecticides and antimicrobials for the control of insects, bacteria and fungi such as the southern army worm, 2-spotted spider mite, yellow fever mosquito, *Staphylococcus aureus*, Bacillus subtilis, acid fast bacterium, downy mildew of lettuce, *Trichophyton mentagrophytes, Candida pelliculosa*, apple scab fungus, tomato late blight, rice blast, *Aspergillus terreus, Pullularia pullulans* and *Rhizopus nigricans*. For such use, the unmodified compounds can be employed. Alternatively, the toxicant compounds can be dispersed on an inert finely-divided solid to prepare dust compositions. The dust compositions can be dispersed in water with or without the aid of a wetting or dispersing agent, the resulting aqueous dispersions being useful as sprays. In other procedures, the compounds can be employed as constituents in oil or solvent compositions, or with or without an emulsifying or dispersing agent in solvent-in-water or water-in-solvent emulsions or dispersions which are useful as sprays, drenches or washes.

The exact concentration of the toxic constituent to be employed in the treating composition is not critical and may be varied considerably provided an effective amount of the toxicant is supplied, whether on the plant or plant part or in the soil, ink, adhesive, cutting oil, textile, paper, wood or other environment of the organism. Good results are obtained when employing compositions containing pesticidal or antimicrobial concentrations and usually from about 500 to 10,000 parts per million by weight of one or more of the compounds. This is not to suggest that the compounds herein claimed and compositions containing them are equally effective at similar concentrations or against the same pests, whether insect, fungal or bacterial. The concentration of toxicant in liquid compositions generally is from about 1–50 percent by weight. Concentrations up to 95 weight percent often are conveniently employed. In compositions to be employed as concentrates, the toxicant can be present in a concentration of from 5–98 weight percent.

In representative operations, each of tricyclohexyltin 5,7-dibromo-8-quinolinolate and tricyclohexyltin 8-quinolinolate when employed in aqueous acetone compositions at a concentration of 500 parts per million gives complete control (100% kill) of southern army worm, 2-spotted spider mite, yellow fever, mosquito, *Staphylococcus aureus, Bacillus subtilis*, acid fast bacteria, and downy mildew.

In further operations, tricyclohexyltin 5,7-dibromo-8-quinolinolate gives 100 percent control of apple scab fungus when employed in an oil-in-water emulsion at a concentration of 500 parts per million.

The preparation of tricyclohexyltin hydroxide is disclosed in U.S. Pat. 3,402,189. The preparation of 8-hydroxyquinoline, 5-, 7- and 5,7-halo substituted 8-hydroxyquinoline are disclosed in U.S. Pat. 3,268,536 at column 6, line 40 et seq. Other substituted 8-hydroxyquinoline starting materials are prepared following known procedures for the preparation of corresponding benzene derivatives.

What is claimed is:

1. The compound corresponding to the formula:

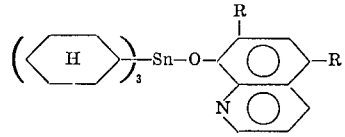

wherein each R independently represents hydrogen, a lower alkyl, a lower alkoxy, a chloro or a bromo group.

2. The compound as claimed in claim 1 wherein each R is hydrogen.

3. The compound as claimed in claim 1 wherein each R is bromo.

References Cited
UNITED STATES PATENTS

| | | | |
|---|---|---|---|
| 2,867,566 | 1/1959 | Weinberg | 260—270 X |
| 3,264,177 | 8/1966 | Kenaga | 260—429.7 X |
| 3,284,296 | 11/1966 | Freburg | 260—270 X |
| 3,480,712 | 11/1969 | Thompson | 264—245 |

DONALD G. DAUS, Primary Examiner

U.S. Cl. X.R.

260—289R, 429.7; 424—245